May 29, 1923.
G. W. CARLSON
1,456,619
LUBRICATION OF AUTOMOTIVE VEHICLE KNUCKLES
Filed April 4, 1922
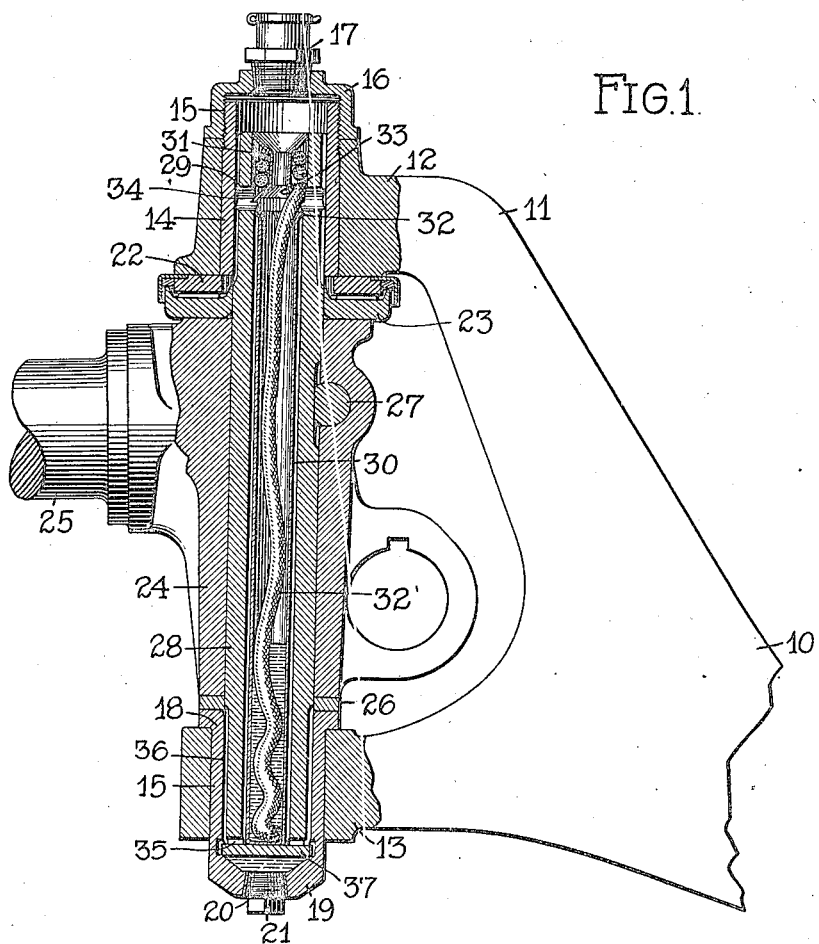
FIG.1.
FIG.2. 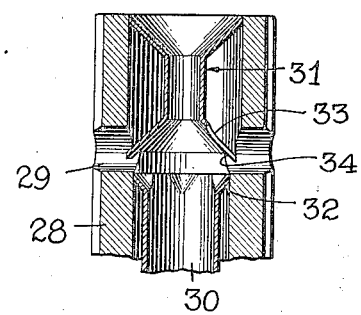 FIG.3.
INVENTOR.
Gustav W. Carlson
BY
his ATTORNEYS.

Patented May 29, 1923.

1,456,619

UNITED STATES PATENT OFFICE.

GUSTAV W. CARLSON, OF CLEVELAND, OHIO, ASSIGNOR TO THE TORBENSEN AXLE COMPANY, OF CLEVELAND, OHIO, A CORPORATION OF OHIO.

LUBRICATION OF AUTOMOTIVE VEHICLE KNUCKLES.

Application filed April 4, 1922. Serial No. 549,593.

*To all whom it may concern:*

Be it known that I, GUSTAV W. CARLSON, a subject of King Gustav V. of Sweden (first U. S. citizenship papers taken out in September, 1918), and a resident of Cleveland, in the county of Cuyahoga and State of Ohio, have invented certain new and useful Improvements in the Lubrication of Automotive Vehicle Knuckles, of which the following is a specification.

My invention relates to lubrication of automotive vehicle knuckles such for example as the lubrication of steering knuckles of automobiles.

The object of the invention is to insure more reliable and efficient lubrication of the bearings of said knuckles.

In carrying out my invention according to the preferred form thereof as herein described, I provide in the hollow knuckle or pivot pin a tube closed at its lower end to serve as a lubricant reservoir and in this tube I place a wick supported at its upper end at the top portion of the tube, and provide means for directing the lubricant from the upper end of the wick to the upper bearing. I also provide a passage between the tube and the inner wall of the pin for conducting oil to the lower bearing.

My invention consists in the novel construction, arrangement and combination of parts hereinafter described according to the preferred embodiment thereof. The invention will be more particularly pointed out in the appended claims.

In the drawings, wherein like reference characters denote like or corresponding parts:—

Figure 1 is a vertical section of a steering knuckle showing the relation of the parts embodied in the improved device.

Figure 2 is an enlarged vertical section of the combined wick support and guide showing its relation to the transverse oil passages and to the flared end of the reservoir or oil container; and Figure 3 is an end view of the oil container showing the manner in which the upper end of the container is flared.

In the embodiment of the invention selected for illustration an axle 10 of conventional form is shown, the axle at one end being provided with a forked extension 11 having aligned bearings 12 and 13. The bearings 12 and 13 are each provided with a bushing, the bushing for the bearing 12 being designated as 14 and the bushing for the bearing 13 being designated as 15. The bushing 14 at its outer end is exteriorly threaded as at 15 to receive an interiorly threaded cap 16 provided with a central filler plug 17 through which the oil or other lubricant is poured in filling the device.

The bushing 15 at its inner end is flanged outwardly as at 18 to overhang the inner face of the bearing 13. At its opposite end it is closed as at 19 except for an opening 20 within which a drain plug 21 is screwed.

In addition to the bushings 14 and 15 a bushing 22 is carried by the bearing 12 and a bushing 23 is carried by the hollow head portion 24 of the wheel spindle 25. These bushings 22 and 23 bear one against the other and constitute one of the active bearing surfaces required to be lubricated. A bushing 26 provided at the lower end of the head portion 24 of the spindle by reason of its bearing contact with the flanged end 18 of the bushing 15 provides a second active bearing surface required to be lubricated.

Within the hollow of the head portion 24 of the spindle and keyed thereto as at 27 I provide a hollow pivot pin 28. The ends of the pivot pin extend into the bushings 14 and 15 and by reason of their engagement with such bushings constitute the remaining bearing surfaces required to be lubricated. The hollow pivot pin 28 is open ended and adjacent to its upper end is provided with one or more transverse openings 29 into and through which lubricant is directed in the operation of the device. These openings lead directly to the active bearing surface as defined by the upper end of the pivot pin and the bushing 14. Within the hollow of the pivot pin and extending substantially throughout its full length I provide an oil reservoir or container 30 of an exterior diameter slightly less than the interior diameter of the pivot pin 28. This container 30 at its lower end is sealed or closed as at 31 and at its opposite end is left open, such open end being flared outwardly as at 32 to bear against the inner walls of the hollow pivot pin thereby providing an oil passage between the oil reservoir and the inner wall of the pivot pin 28. Immediately above the open flared end of the reservoir 30 and preferably in the immediate vicinity of the transverse openings 29, I provide a substantially spool shaped wick support designated in its entirety as 31. This support is hollow throughout, whereby an oil passage is provided directly beneath the filler plug 17 through which the oil is used in replenishing the supply is free to pass in filling the oil container 30. Around the stem of this spool-like support is wound one end of a wick 32, the wick at its opposite end being extended to a point at or near the bottom of the oil container. To provide for the extension of the wick beyond the spool and into the oil container the lower flared end of the spool is notched as at 33. A shoulder 34 formed in the hollow of the pivot pin provides a suitable supporting means for the wick support. Preferably, the top surface of the shoulder 34 is inclined, the inclination corresponding to the angularity of the bottom flared end of the wick support. Thus arranged, the lubricant fed by the wick to its upper end is guided toward and into the transverse openings 29.

At the bottom end of the pivot pin 28 transverse oil grooves 35 are formed to provide for the passage of the lubricant to the active bearing surface defined by the bushing 15 and the lower end of the hollow pivot pin on the one hand and the flanged end 18 of the bushing and the bushing 26 on the other. To facilitate the free passage of the lubricant to the several active bearing surfaces oil passageways or grooves 36 are formed in the pivot pin at its opposite ends, such grooves being substantially coextensive with the bushing walls requiring lubrication. As a support for the reservoir a disk 37 may be provided at the lower end of the hollow pivot pin, such disk being held against the bottom end of the reservoir and in place by its engagement with the closed end 19 of the bushing 15.

The oil, it will be noted, is conducted to the several bearing surfaces by independent paths. The oil or lubricant is first elevated by means of the wick 32 to a point above, although in the vicinity of the transverse openings 29. At the point where the wick extends without the oil container 30 a certain amount of the oil elevated by the wick gravitates through the oil passageway formed on the outside of the container to the bottom thereof, whence it flows laterally through the oil passageway 35 to enter the grooves 36 formed in the lower end of the pivot pin. In this manner the active bearing surfaces at the lower end of the spindle are thoroughly and at all times properly lubricated. The oil carried beyond the upper end of the oil container by the wick 32 finds its way to the transverse openings 29 in the pivot pin, this movement of the oil being guided by the bottom flared end of the wick support. From the openings 29 the oil enters the active bearing surfaces provided at the upper end of the steering knuckle.

The arrangement described not only forms a very simple means of effecting lubrication of the various active bearing surfaces, but enables the one wick used to jointly supply the active bearing surfaces at the opposite ends of the pivot. The hollow wick support is so constructed that the oil supplied to the container 30 may be replenished and at the same time directs the oil carried beyond the upper end of the oil reservoir laterally into the opening 29. In operation, the wheel spindle 25, its head portion 24, and the hollow pivot pin 28 rotate together.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:—

1. In a device of the character described, a hollow pivot pin, an active bearing surface, a container for lubricant enclosed in the hollow of the pivot pin and from the upper portion of which the lubricant is adapted to flow down between the container and the hollow pin to the active bearing surface, and a means for conducting the lubricant upwardly and out from the upper portion of the container for lubricating the bearing.

2. In a device of the character described, a hollow pivot pin provided with a transverse opening, spaced active bearing surfaces, a container for lubricant enclosed in the hollow pivot pin and terminating at one end in close proximity to said transverse opening, and means enclosed in the lubricant container for conducting the lubricant to said transverse opening and to and over the top edge of the container, the lubricant entering said opening being directed onto one of said bearing surfaces, and the lubricant spilling over the top edge of the container being directed to the other of said active bearing surfaces.

3. In a device of the character described, a hollow pivot pin, an active bearing surface at the lower portion thereof, a container for lubricant enclosed in the hollow of the pivot pin, the inside diameter of the pivot pin being more than the outside diameter of the container, whereby an oil passage is provided within the hollow pivot pin on the exterior of the container, and means within the container for conducting the lubricant up to and out of the upper portion thereof, the lubricant thus conducted being directed toward and through the oil passage and onto said bearing surface.

4. In a device of the character described, a hollow pivot pin provided with a transverse opening, spaced active bearing surfaces, a container for lubricant enclosed in the hollow of the pivot pin, and provided with an open end situated closely adjacent to said transverse opening, and a wick enclosed within the container and extended beyond the open end thereof for conducting the lubricant upwardly to a point in the vicinity of said opening where it is free to either enter said opening or to spill over the top edge of the container, the lubricant thus conducted being directed by different paths respectively to the spaced active bearing surfaces.

5. In a device of the character described, a hollow pivot pin, an active bearing surface, a container for lubricant closed at one end and open at its opposite end and enclosed within the hollow of the pivot pin, the open end of the container being flared outwardly so as to engage the inner wall of the hollow pivot pin and being of a diameter less than the inside diameter of the hollow pivot pin, whereby an oil passage is provided between said container and the inner wall of the pivot pin through which the oil is free to flow in its movement toward the active bearing surface, a wick extended at one end within the container and at its opposite end extended towards the open end thereof, said wick being adapted to conduct the lubricant within the container to said passage, and a support for the wick spaced slightly above the upper open end of the lubricant container.

6. In a device of the character described, a hollow pivot pin, a container for lubricant enclosed in the hollow of the pivot pin, an active bearing surface, a wick for conducting the lubricant from within the container toward said active bearing surface, and a hollow wick support mounted within the hollow of the pivot pin in axial alignment with the lubricant container, the hollow of the wick support affording an unobstructed passageway for the lubricant in filling the lubricant container.

7. In a device of the character described, a hollow pivot pin, a container for lubricant enclosed within the hollow of the pivot pin, said container being provided with a sealed bottom end and an open top end, an end closure for the hollow pivot pin affording a rest for the sealed bottom end of the container, an active bearing surface, and means extended within the container for conducting the lubricant upwardly and over the top edge thereof for ultimate delivery to said active bearing surfaces.

Signed at Cleveland, in the county of Cuyahoga and State of Ohio, this 23rd day of March, A. D. 1922.

GUSTAV W. CARLSON.